Patented Feb. 6, 1934

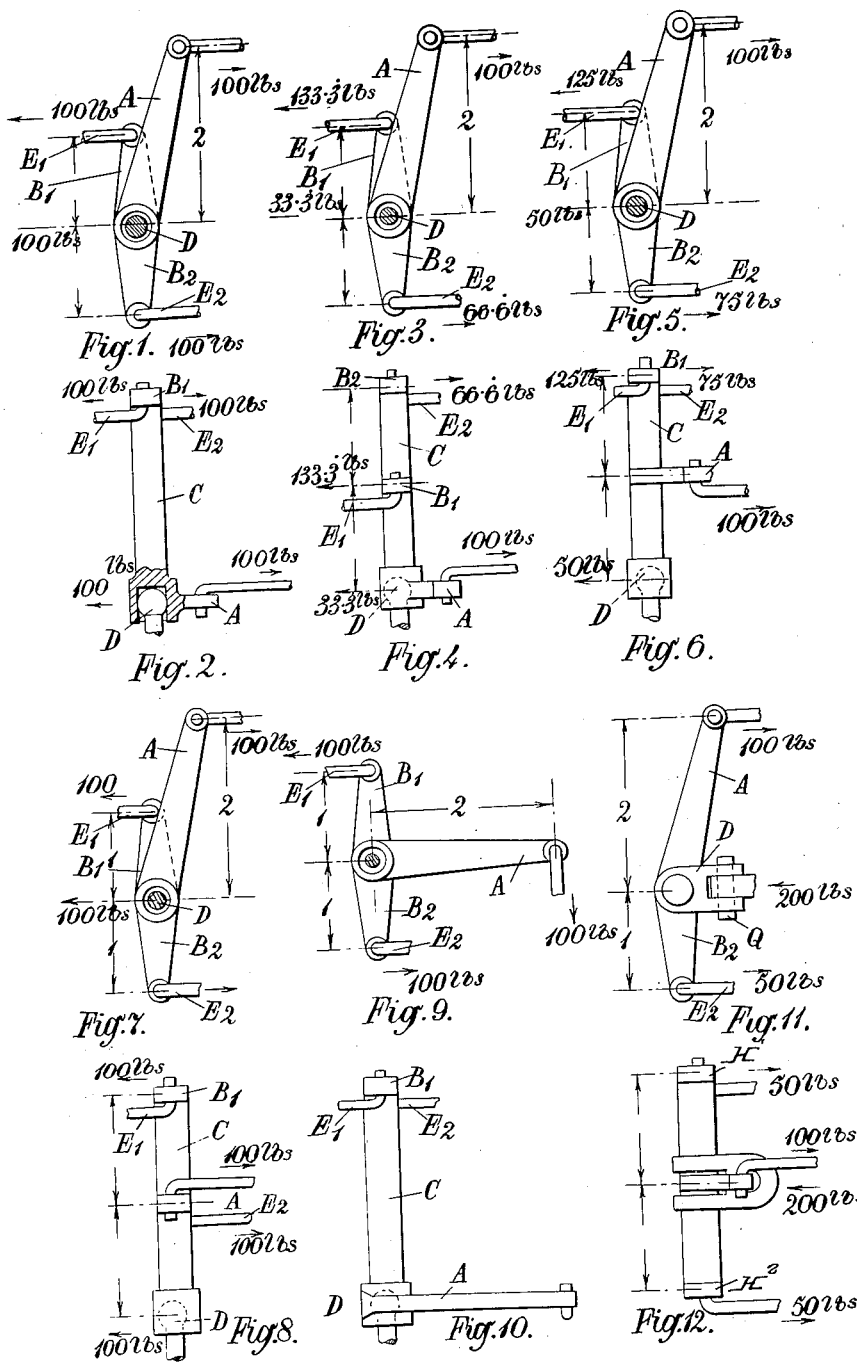

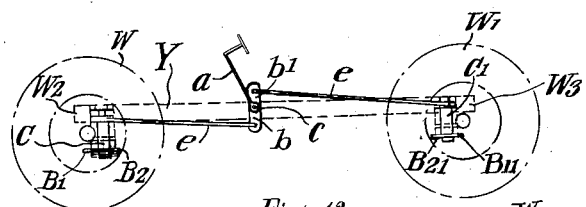
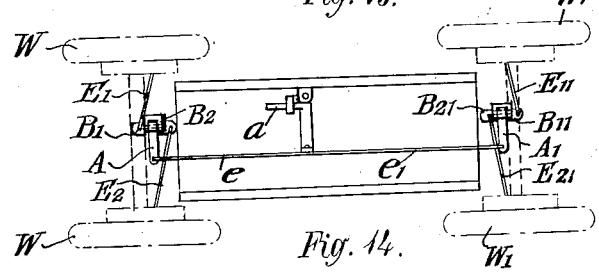
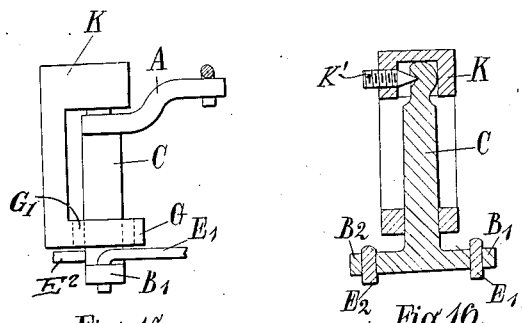
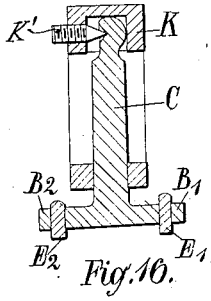
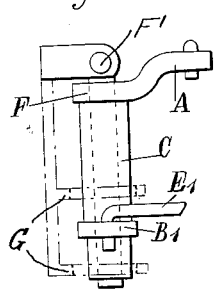
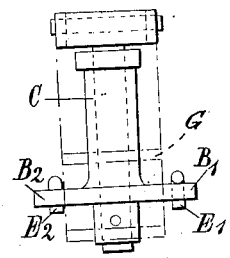

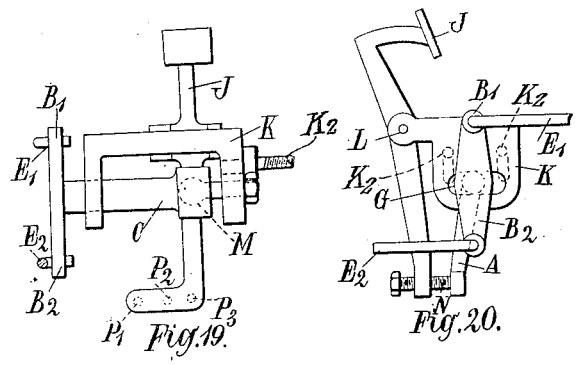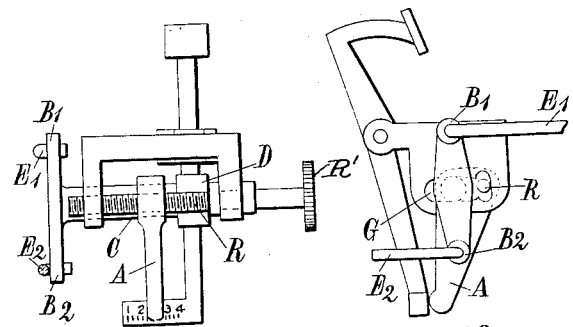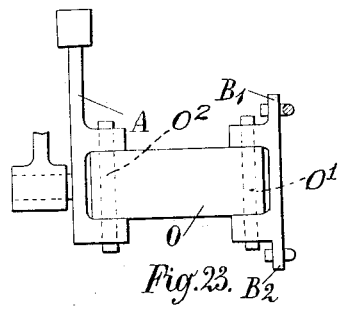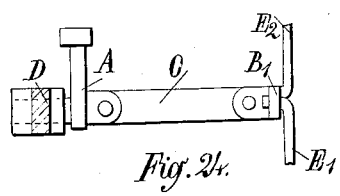

1,945,891

UNITED STATES PATENT OFFICE 1,945,891

BRAKING MECHANISM

Albert Henry Godfrey Girling, Harlow, England

Application July 19, 1929, Serial No. 379,515, and in Great Britain July 23, 1928

11 Claims. (Cl. 188—204)

My invention is an improved means for distributing the effort exerted by a vehicle driver when applying brakes so that an equal proportion or any pre-arranged proportion of his effort shall reach each of two or more brakes.

For this purpose, at each position where the control effort is subdivided, the primary effort actuates a lever projecting radially from a shaft adjacent to its end, the shaft being supported by a single bearing mounted on the vehicle at one end of the shaft and permitting the latter both to rotate and swing. The effect of this combination is to develop a torque in the shaft. At the other end of the shaft are two levers projecting on radii approximately 180 degrees apart and in a plane parallel to the plane in which the primary lever lies. These secondary levers are connected to rods extending in substantially opposite directions and at right angles to the secondary levers when in their mid position of semi-rotation. This end of the shaft is free from restraint in the direction of the length of the two rods, so that when by virtue of the torque developed in the shaft an effort is developed in each rod, the end of the shaft and the secondary levers are free within reasonable limits to take up a position where the efforts in the secondary rods are equal.

When the secondary rods lie along parallel lines, or where their axes both incline towards or from and subtend equal angles to a line passing across the axis of rotation of the two levers, there will be no tendency for the shaft to move otherwise than parallel to the mean line of the rods, but where the rods are not so placed some guide or abutment will be required to constrain the shaft to move in the correct balancing direction only.

A complete four-wheel brake-control system would embody three shafts according to my invention, the first one being placed adjacent to the driver's foot with its axis horizontal and carried by a single bearing member mounted on the chassis at one end of the shaft and so arranged that the shaft is free to rotate about its axis and also to rock in a horizontal plane within limits, but being prevented from any other movement. Adjacent to this end is a lever arranged in an approximately vertical direction. This lever may be either the foot pedal or the hand lever used to control the brakes, or these controls may be operatively connected to the lever by means of suitable rods or the like. At the free end of the shaft are the secondary levers projecting approximately upwards and downwards on radii about 180 degrees apart, one of these levers being connected by a rod or the like to the primary lever of a shaft carried by the front axle, and the other by a similar rod to a similar unit carried by the back axle. At each axle the shaft is placed with its axis vertical, carried by a single bearing member mounted on the axle at one end of the shaft permitting the latter both to rotate and swing, the primary levers being placed transversely to the vehicle and the secondary levers at the free ends of the shafts being placed lengthwise of the vehicle. Rods from each secondary lever, placed approximately parallel to the axis of each axle, convey the brake-operating forces direct to the operative mechanism of the four brakes, which are situated in road wheels.

By these means or some suitable adaptation of my principle I obtain an equal division of effort between four brakes, and within the limits imposed by design, the ends of the three shafts being free to select positions where the forces on the rods are all equal, if any rod or brake is incorrectly adjusted the compensating action will ensure equality of effort at each of the wheels. This form of compensation is particularly effective, because if it is properly designed the only frictional resistance to the compensating swing of the shaft is that at the fixed end bearing, which, because of the small angular movement of the shaft during its compensating swing, has but little effect at its free end, where the secondary efforts are balanced.

The bearing at the fixed end may be spherical or may be carried in trunnions or may be a pinpoint bearing, the axis of which or the centre of which lies in a plane containing the radii of the secondary levers. Since the action depends upon a moment produced in the shaft, and any other result from the primary force is not desired, the bearing is in its best position when centralized in a plane containing the primary lever, but this may not always be possible, and to resist displacement of the free end of the shaft otherwise than in the compensating direction guides may be needed, or the secondary rods may be placed in such directions as to develop forces that will balance all the forces developed by the primary lever. If three levers placed in radii approximately 120 degrees apart are fitted to the free end of the shaft, and this end has no restraint, the primary force may be divided into three substantially equal, balanced forces.

In place of what would be normally described as a shaft any convenient formation may be used to connect the levers providing it will resist torsion, for instance a bent piece or arched piece might be necessary to avoid some local obstruction.

It is frequently desirable to divide and distribute a primary force as two unequal secondary forces. In this case the secondary levers are not in one plane but lie in parallel planes, one being nearer to the free end of the shaft than the other. This construction imposes dual functions upon the shaft, which transmits torque and also acts as a lever in the plane in which it moves to balance the forces. By the latter action the force developed in the rod connected to the lever nearest the free end is less than that in the other rod. This action is useful where greater power is required from the front than from the back brakes of a vehicle, or a similar result may be obtained by placing the primary lever in an intermediate plane between the fixed bearing and the secondary levers. By this means the primary effort tends to displace the shaft in the direction of its balancing movement, a tendency resisted by one of the rods thereby increasing the load on this rod and decreasing that on the other rod by a like amount. If the levers are made movable at will along the shaft any desired proportion of effort may be obtained at will, and a hand control could be used to obtain the correct proportion of brake effort between front and back wheels to suit any condition of road surface, marked for instance "Dry", "Wet" or "Icy", and this would be useful in countries where the varying conditions were frequently met with.

Another variation under my principle is to place the primary lever and the fixed bearing in an intermediate plane between parallel planes containing two secondary levers, the three levers being joined by a suitable shaft or torsion member, which must also be capable of acting as a beam. The two secondary levers lie in one plane containing the axis of the shaft, are 360 degrees apart, and are joined to rods extending in the same direction on approximately parallel lines. When an effort is applied to the primary lever the resulting torque in the shaft develops a stress in each secondary rod, and the shaft being free to rock about its central bearing in a plane containing the secondary rods, moves till it is in a position where the forces in the two rods are equal; or if the three levers are at unequal distances apart the forces will be balanced in a similar unequal proportion. This method is useful where two brakes on one axle are controlled by one cross shaft.

As described, the shaft is deflected angularly when balancing the forces, and the various connected rods might jam if held to their lever by closely fitting pivots. To avoid this I may join the levers to the shaft so that whilst transmitting forces due to torque they can move freely to remain in alignment with the connected rods, or I may place a universal joint in the shaft close to each lever so that the axis of the shaft at the lever remains parallel to the axis of the pivot joining the rod to the lever, whilst the axis of the intermediate shaft between the levers may be deflected angularly to effect compensation.

Figures 1 to 12 of the accompanying drawings show how my invention may be applied. In each figure the primary lever is indicated by the index letter A, the secondary levers by $B_1$ and $B_2$, the connecting shaft by C, and the bearing by D.

Figures 1 and 2 show how the levers and shaft may be arranged to distribute equal forces along two rods $E_1$ and $E_2$, the stress on the shaft C being torsional. Figure 2 is cut away to show the spherical bearing located in the plane containing the primary lever, the pivot of this bearing being attached to any convenient fixed member.

Figures 3 and 4 show how by placing a secondary lever $B_1$ in a plane between the planes containing the primary lever A and the secondary lever $B_2$ a greater effort is developed in the rod $E_1$ than in the rod $E_2$, any desired proportion being obtainable by selecting the appropriate intermediate plane. The forces are balanced so as to maintain the correct proportion, and the angular movements of the lever and travel of the rods remain equal. The latter is a very useful feature, for where simple levers are employed to deliver a greater effort to one brake than to another the rods transmitting the greater effort move a proportionately smaller distance, and because of this reduced movement, in conjunction with increased strain of the parts, are unable to move the braking elements far enough to realize the greater braking power expected from the increased leverage.

Figures 5 and 6 show how balanced, unequal secondary forces may be developed by placing the primary lever in a plane between the planes containing the bearing and the secondary levers.

Figures 7 and 8 show how by placing the primary lever A and the secondary lever $B_2$ in one plane, between the planes containing the secondary lever $B_1$ and the bearing D, the primary force may be divided, balanced, and distributed as two equal forces.

The shafts in Figures 3 to 8 are subject to torsional and bending stresses. As viewed in Figures 3, 5 and 7 the movements are angular about the axes of the shafts, and the angular movements of all the levers are equal, so that unless the axis of the shaft moves the travels of the rods $E_1$ and $E_2$ are equal. As viewed in Figures 4 and 6 and 8 the shafts when balancing the forces tend to swing about the centre of the bearing and so act as a beam; hence the unequal but balanced proportion of effort on the rods $E_1$ and $E_2$, the shaft being subject to bending stresses.

Figures 9 and 10 show how a primary force may be divided, balanced and distributed in two directions at right angles to the line of the primary force.

Figures 11 and 12 show how by placing the secondary levers in planes on either side of a plane containing the primary lever a force may be divided, balanced and distributed parallel to the line of the primary force. In Figure 11 the movements are angular about the axis of the shaft and the resultant stresses in the shaft are torsional. As viewed in Figure 12 the movements when balancing the forces are about the centre Q of the pivoted bearing and the shaft is subject to bending stresses, the proportion between the secondary forces at $H_1$ and $H_2$ being determined by the relative distances of the three planes containing the three levers.

In the various arrangements shown there are an infinity of planes in which the levers may be placed in relation to each other, and of proportions of lever lengths, so that any desired relationship between the values of the forces and the movements of the rods may be obtained to satisfy any conditions that may arise.

Fig. 13 shows a side view on a reduced scale and

Fig. 14 a plan of a vehicle chassis equipped with control effort balancing devices for four brakes. The brakes of the front wheels W, W are actuated by rods $E_1$, $E_2$ connected to the secondary levers $B_1$, $B_2$ fixed on the free end of the shaft C, on the other end of which is fixed the primary lever A. The brakes of the rear wheels $W_1$ are similarly actuated by rods $E_{11}$, $E_{21}$ connected to the secondary levers $B_{11}$, $B_{21}$ fixed on the free end of the shaft $C_1$ on to the other end of which is fixed the primary lever $A_1$. The shafts C, $C_1$ are supported by a single bearing member mounted on the front and rear axles $W_2$, $W_3$, respectively at one end of the shaft. The bearing members are carried by pivots, the axes of which are parallel to the centre lines of the secondary levers, so as to enable the shafts C, $C_1$ to rock about these axes as well as turn about their own axes of rotation. The primary levers A, $A_1$ are connected by rods $e$, $e_1$ to secondary levers $b$, $b_1$ fixed on the free end of a shaft $c$, on the other end of which is fixed a brake pedal $a$ and supported by a single bearing member mounted on a side member of the chassis Y at one end of the shaft. The shafts C, $C_1$ are arranged with their axes vertical, while the shaft $c$ is arranged with its axis horizontal. The detail construction of the bearing members and pivots therefor is described hereinafter and is the same for the three balancing devices.

Figure 15 shows an elevation and

Figure 16 a sectional view of a lever assembly. The levers A, $B_1$ and $B_2$ and the shaft C are in one piece, and a pointed screw $K_1$ held by a bracket K bears at the centre of the spherical end of the shaft C to allow for semi-rotational and rocking movements, the shaft C being countersunk for this purpose as shown. Guides $G_1$ on the bracket K restrain the shaft C to its correct balancing movement. A stop G indicated by interrupted lines may be fitted to limit the balancing movement to one plane. This is useful in the event of any rod or other part breaking, as the stop ensures the remaining rod and its connected brakes being effective.

Figures 17 and 18 show two views on a larger scale of the arrangement of balancing devices in Figs. 13 and 14 wherein the levers are joined to and are part of a tubular shaft, supported by an inside spindle F. The latter is carried at its end adjacent to the primary lever by a transverse pivot $F_1$ the axis of which is parallel to the centre lines of the secondary levers, this pivot being supported from some fixed part of the chassis or axle. A stop G, shown by interrupted lines, may be fitted to limit the balancing movement if desired.

Figures 19 and 20 show how a balance lever may be arranged as one unit with a control pedal. The pedal J is pivoted to a bracket K at L and carries at its lower end a set screw N which bears against the primary lever A. A spherical bearing M and a stop and guides G are provided. The set screw is adapted to be placed in several positions $P_1$, $P_2$, $P_3$ to obtain various proportions between the values of the secondary forces. The bracket K may be carried by bolts $K_2$ or the like, passing through slotted holes, from any fixed part of the vehicle. By sliding the assembly one way or the other on the bolts the shaft may be correctly centralized in its guides, and by operating the set screw N the correct pedal height may be obtained. These two adjustments serve to correct for all variables in the length of the rods, chassis and other parts, obviating the necessity for adjustable rods or the like.

Figures 21 and 22 show how the above arrangement may be modified to provide a hand control to allow the proportion between the secondary forces to be altered at will. In this the primary lever is slidable along its shaft, and may be moved by means of a screwed rod R operated by a hand wheel $R_1$. The lever A is keyed or splined on the shaft C. The hand wheel may be marked "Wind this way for dry roads" and "Wind this way for wet or ice-covered roads". This method could also be applied to the balance levers fitted to the axles (as shown in Figures 13 and 14) so that the proportion of effort between the two brakes on one axle could be altered at will to compensate for variable friction at the braking surfaces, variable loads on the two wheels or other variables.

Figures 23 and 24 show how an articulated shaft may be employed to maintain the levers in planes parallel to their connected rods. Here the primary lever A is shown as a pedal supported by the fixed bearing D. Hinged to the lever A by the pivot pin $O_2$ is the torsional and swinging member O, and hinged to the member O by the pivot pin $O_1$ are the secondary levers $B_1$ and $B_2$ made in one piece. By this means the various pivots and bearings may be constructed substantially and remain in their true bearing lines whilst the secondary levers are free to rotate and rock as required to fulfill their functions.

There are of course many ways in which my principle may be applied, those described and illustrated being merely given by way of example.

What I claim is:—

1. In connection with braking mechanism a control effort balancing device comprising a shaft, a single bearing member for the shaft permitting the shaft to rotate about its own axis and also swing in a plane about an axis perpendicular to its own axis, a primary lever attached substantially radially to the said shaft so as to be capable of imparting to the shaft a torque about the axis of the shaft, a pair of secondary levers attached substantially radially to the shaft, and operating rods connected to the free ends of the secondary levers, the said rods being parallel to the plane in which the shaft swings.

2. In connection with braking mechanism a control effort balancing device comprising shaft, a single bearing in which the shaft can rotate about its own axis and in which it can also swing in a plane about an axis perpendicular to its own axis, the bearing being located in the neighbourhood of one end of the shaft, a primary lever attached substantially radially to the said shaft so as to be capable of imparting to the shaft a torque about the axis of the shaft, a pair of secondary levers attached substantially radially to the shaft, and operating rods connected to the free ends of the secondary levers, the said rods being parallel to the plane in which the shaft swings.

3. In connection with braking mechanism a control effort balancing device comprising a shaft, a bearing in which the shaft can rotate about its own axis and in which it can also swing about an axis perpendicular to its own axis, a primary lever attached substantially radially to the said shaft and capable of imparting to the shaft a torque about the axis of the shaft, the said primary lever being slidable along the shaft, means for shifting the primary lever along the shaft, secondary levers attached substantially radially to the shaft, and operating rods connected to the free ends of the secondary levers, the said rods being parallel to the plane in which the shaft swings.

4. In connection with braking mechanism a control effort balancing device comprising a shaft, a bearing in which the shaft can rotate about its own axis and in which it can also swing about an axis perpendicular to its own axis, a primary lever attached substantially radially to the said shaft and capable of imparting to the shaft a torque about the axis of the shaft, secondary levers attached substantially radially to the shaft, one of the levers being slidable along the shaft, means for shifting the slidable lever along the shaft, and operating rods connected to the free ends of the secondary levers, the said rods being parallel to the plane in which the shaft swings.

5. In connection with braking mechanism a control effort balancing device comprising a shaft, a bearing in which the shaft can rotate about its own axis and in which it can also swing about an axis perpendicular to its own axis, a primary lever attached substantially radially to the said shaft and capable of imparting to the shaft a torque about the axis of the shaft, secondary levers attached substantially radially to the shaft, one of the levers being slidable along the shaft, accessible means for adjusting the position of the slidable lever on the shaft, and operating rods connected to the free ends of the secondary levers, the said rods being parallel to the plane in which the shaft swings.

6. In connection with braking mechanism a control effort balancing device comprising a shaft, a bearing in which the shaft can rotate about its own axis and in which it can also swing about an axis perpendicular to its own axis, a primary lever attached substantially radially to the said shaft and capable of imparting to the shaft a torque about the axis of the shaft, secondary levers attached substantially radially to the shaft, one of the levers being slidable along the shaft, accessible means for adjusting the position of the slidable lever on the shaft, a visible indicator showing how the slidable lever is set, and operating rods connected to the free ends of the secondary levers, the said rods being parallel to the plane in which the shaft swings.

7. In connection with braking mechanism a control effort balancing device comprising a shaft, a bearing in which the shaft can rotate about its own axis and in which it can also swing about an axis perpendicular to its own axis, a primary lever attached substantially radially to the said shaft and capable of imparting to the shaft a torque about the axis of the shaft, secondary levers attached substantially radially to the shaft, one of the levers being slidable along the shaft, accessible means for adjusting the position of the slidable lever on the shaft, a visible indicator showing how the slidable lever is set, and for what condition of road surface such a setting is suitable, and operating rods connected to the free ends of the secondary levers, the said rods being parallel to the plane in which the shaft swings.

8. In connection with braking mechanism a control effort balancing device comprising a shaft, a bearing in which the shaft can rotate about its own axis and in which it can also swing in a plane about an axis perpendicular to its own axis, a brake pedal attached substantially radially to the said shaft so as to be capable of imparting to the shaft a torque about the axis of the shaft, a pair of secondary levers attached substantially radially to the shaft, and operating rods connected to the free ends of the secondary levers, the said rods being parallel to the plane in which the shaft swings.

9. In connection with braking mechanism a control effort balancing device comprising a shaft, a single bearing member for the shaft permitting the shaft to rotate about its own axis and also swing in a plane about an axis perpendicular to its own axis, a brake control lever attached substantially radially to the said shaft so as to be capable of imparting to the shaft a torque about the axis of the shaft, a pair of secondary levers attached substantially radially to the shaft, and operating rods connected to the free ends of the secondary levers, the said rods being parallel to the plane in which the shaft swings.

10. In connection with braking mechanism a control effort balancing device comprising a shaft, a single bearing in which the shaft can rotate about its own axis and in which it can also swing in a plane about an axis perpendicular to its own axis, the bearing being located in the neighbourhood of one end of the shaft, a primary lever attached substantially radially to the said shaft so as to be capable of imparting to the shaft a torque about the axis of the shaft, a pair of secondary levers attached substantially radially to the shaft, operating rods connected to the free ends of the secondary levers, the said rods being parallel to the plane in which the shaft swings, and guiding means for constraining the shaft to swing in the correct plane for balancing the braking forces.

11. In connection with braking mechanism a control effort balancing device comprising a shaft, bearing means for supporting the shaft and permitting it to rotate about its own axis and also to swing about an axis perpendicular thereto, a primary lever attached substantially radially to the said shaft and capable of imparting to the shaft a torque about the axis of the shaft, a pair of secondary levers pivotally attached substantially radially to the shaft with their pivotal axis parallel to the axis about which the shaft swings, so as to be capable of turning with the shaft about the axis of the shaft and of swinging about an axis perpendicular to the axis of the shaft, and operating rods connected to the free ends of the secondary levers, the said rods being parallel to the plane in which the shaft swings.

ALBERT HENRY GODFREY GIRLING.